United States Patent
Shvodian et al.

(10) Patent No.: US 7,548,552 B2
(45) Date of Patent: Jun. 16, 2009

(54) METHOD FOR POLLING IN A MEDIUM ACCESS CONTROL PROTOCOL

(75) Inventors: William M. Shvodian, McLean, VA (US); Sanjeev K. Sharma, Herndon, VA (US)

(73) Assignee: Freescale Semiconductor, Inc., Austin, TX (US)

(*) Notice: Subject to any disclaimer, the term of this patent is extended or adjusted under 35 U.S.C. 154(b) by 801 days.

(21) Appl. No.: 11/036,133

(22) Filed: Jan. 18, 2005

(65) Prior Publication Data

US 2006/0159118 A1 Jul. 20, 2006

(51) Int. Cl.
*H04L 12/42* (2006.01)
(52) U.S. Cl. .................... 370/449; 370/450; 370/462
(58) Field of Classification Search ............ 370/449, 370/450, 462
See application file for complete search history.

(56) References Cited

U.S. PATENT DOCUMENTS

| | | | |
|---|---|---|---|
| 5,166,675 A * | 11/1992 | Amemiya et al. | 340/3.51 |
| 7,031,294 B2 * | 4/2006 | Aiello et al. | 370/348 |
| RE40,032 E * | 1/2008 | van Bokhorst et al. | 455/343.2 |
| 2003/0149971 A1 * | 8/2003 | Basil et al. | 725/16 |
| 2003/0152059 A1 | 8/2003 | Odman | |
| 2004/0141489 A1 * | 7/2004 | Benveniste | 370/345 |
| 2004/0160930 A1 | 8/2004 | Choi et al. | |

OTHER PUBLICATIONS

International Search Report for related PCT application issued Sep. 5, 2007.

* cited by examiner

*Primary Examiner*—Jason E Mattis

(57) ABSTRACT

A method is provided for a master device (601) to allocate channel time. The master device sends a polling frame (240) to a current destination slave device (602) and a current polled slave device (603). The polling frame includes a current destination slave device address (350), a current polled slave device address (360), and a current payload (330). The master device receives a poll acknowledgement frame (280) if the current polled slave device does not wish to transmit data. However, if no poll acknowledgement frame is received, the master device waits for a set duration then sets the current destination device address to be equal to a new destination device address, sets the current polled device address to be equal to a new polled slave device address, and sets a current payload to be equal to a new payload. This can be repeated until a channel time allocation ends.

21 Claims, 8 Drawing Sheets

METHOD FOR POLLING IN A MEDIUM ACCESS CONTROL PROTOCOL

FIELD OF THE INVENTION

The present invention relates in general to communication systems, such as wireless ultra wideband (UWB) systems, including mobile transceivers, centralized transceivers, related equipment, wireless local area networks, and corresponding methods. In particular, the present invention relates to a method for dividing up an available channel in a way that allows for efficient sharing of total transmission time. More specifically, the present invention relates to a method for passing frames between devices in a network using a polling scheme in which the controller of a given channel time allocation can poll individual devices to determine whether they have frames of their own to transmit, This polling can be done simultaneously along with the transmission of data frames from the controller of the channel time allocation to other devices. As a result, the overhead for the polling is minimal.

BACKGROUND OF THE INVENTION

In communications systems with limited bandwidth, a problem can occur when multiple networks or multiple devices want to operate over the same channel using the same bandwidth. Some sort of scheme must be implemented to separate the networks in some way so that transmissions from one will not interfere with transmissions from the other.

One option for handling multiple networks or devices is to use a time division multiple access (TDMA) scheme. In a TDMA scheme, the available transmission time is broken up into multiple time slots, and each network or device is assigned one or more of the time slots. Thus, each device is given some portion of the available transmission time to use and is forced to remain silent during all other times.

However, in order to avoid having colliding messages caused by devices transmit in the same time slot, one device will generally be designated as the master or coordinator. Typically a single device will control all of the channel time in a network, though it may delegate control to other devices for some portion of the channel time. Then, whoever is in charge of a sub-portion of the available channel time can assign individual devices in the network to even smaller portions of that sub-portion of the channel time.

However, not all devices in the network will require the same amount of channel time for transmitting data. The controlling device (often called a master device) must determine somehow which devices require how much channel time so that it can be allocated in a reasonable manner. Otherwise some devices may be given too much channel time (which would be wasted if they had nothing to send), and other devices may be given too little channel time (which could cause problems if specific quality of service needs required more channel time).

One way to accomplish this is to have each device subordinate to the master device (often called the slave devices) periodically send specific requests to the master device indicating how much channel time they will need. Based on the requests from each device, the master can then allocate the channel time accordingly.

However, the passing of such requests from slave devices to the master consumes overhead. Every request to the master takes up channel time that could otherwise be used for sending data. As a result, it would be desirable to limit the amount of channel time allocated to this allocation messaging. This will in turn extend the time between channel Lime requests from each slave device.

Unfortunately this leads to a different problem in that it limits the ability of the master device to allocate channel time based on current needs for the slave devices. In this scheme, a slave device must predict how much channel time it will need until the next time for channel time requests. And if those needs change, the slave device must either suffer from lack of needed channel time, or waste assigned channel time when it has no data to transmit.

Therefore, it would be desirable to provide a TDMA channel time allocation scheme that minimizes the overhead cost, while providing flexibility to dynamically change channel time allocations without relying on a random access contention mechanism like CSMA/CA.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Wireless Network

Figure 1:
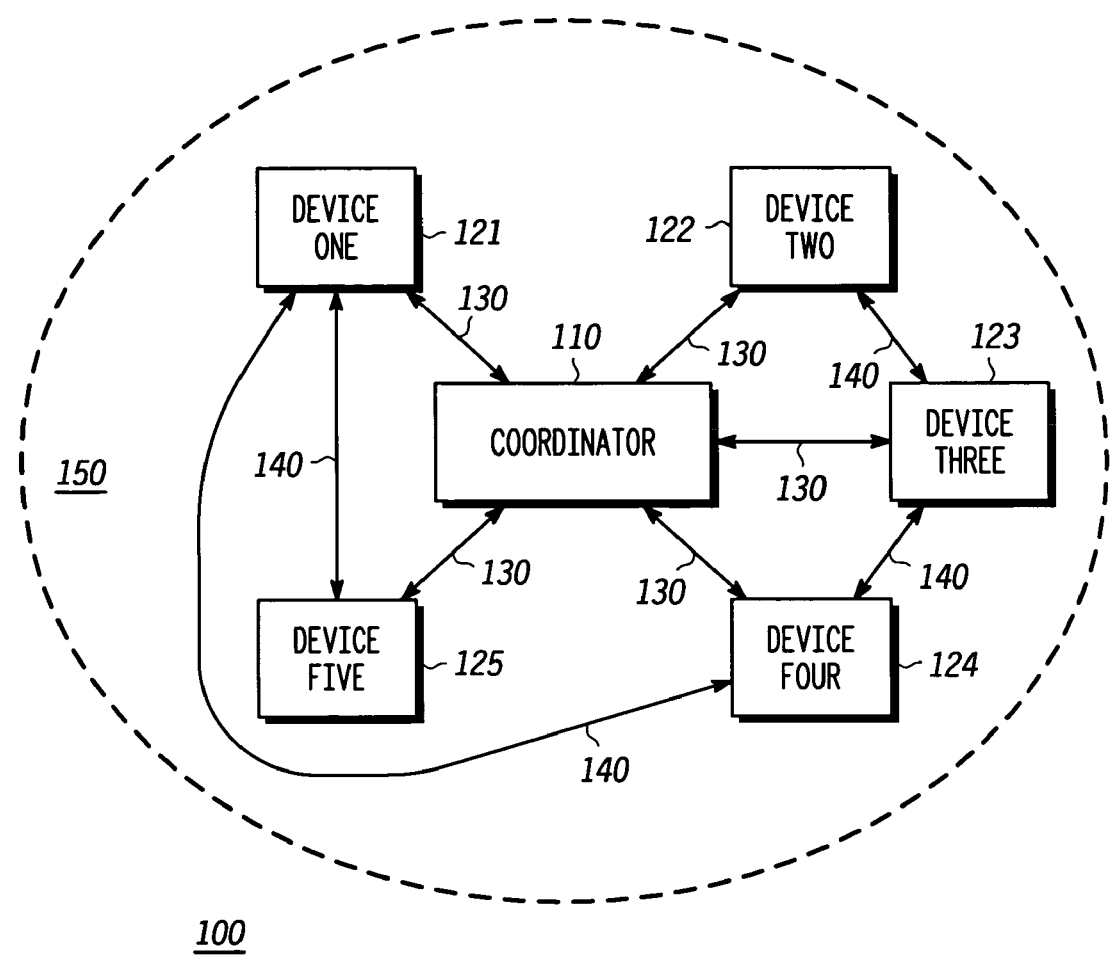
FIG. 1 is a block diagram of a wireless network according to a disclosed embodiment of the present invention.

FIG. 1 is a block diagram of a wireless network 100 according to a disclosed embodiment of the present invention. In this embodiment the network 100 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 1, the network 100 includes a coordinator 110 and a plurality of devices 121-125. The coordinator 110 serves to control the operation of the network 100. As noted above, the system of coordinator 110 and devices 121-125 may be called a piconet, in which case the coordinator 110 may be referred to as a piconet coordinator (PNC). Each of the non-coordinator devices 121-125 must be connected to the coordinator 110 via primary wireless links 130, and may also be connected to one or more other non-coordinator devices 121-125 via secondary wireless links 140, also called peer-to-peer links.

In addition, although FIG. 1 shows bi-directional links between devices, they could also be shown as unidirectional links. In this case, each bi-directional link 130, 140 could be shown as two unidirectional links, the first going in one direction and the second going in the opposite direction.

In some embodiments the coordinator 110 may be the same sort of device as any of the non-coordinator devices 121-125, except with the additional functionality for coordinating the system, and the requirement that it communicate with every device 121-125 in the network 100. In other embodiments the coordinator 110 may be a separate designated control unit that does not function as one of the devices 121 -125.

In some embodiments the coordinator 110 will be a device just like the non-coordinator devices 121-125. In other embodiments the coordinator 110 could be a separate device dedicated to that function. Furthermore, individual non-coordinator devices 121-125 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a digital still camera, a digital video camera, a personal data assistant (PDA), a digital music player, or other personal wireless device.

The various non-coordinator devices 121-125 are confined to a usable physical area 150, which is set based on the extent to which the coordinator 110 can successfully communicate with each of the non-coordinator devices 121-125. Any non-coordinator device 121-125 that is able to communicate with the coordinator 110 (and vice versa) is within the usable area 150 of the network 100. As noted, however, it is not necessary for every non-coordinator device 121-125 in the network 100 to communicate with every other non-coordinator device 121-125.

Time Division Multiple Access (TDMA) Scheme

The available bandwidth in a given network 100 may be split up in time by the coordinator 110 into a series of repeated superframes. These superframes define how the available transmission time is split up among various tasks. Individual frames of data are then transferred within these superframes in accordance with the timing set forth in the superframe.

Figure 2:
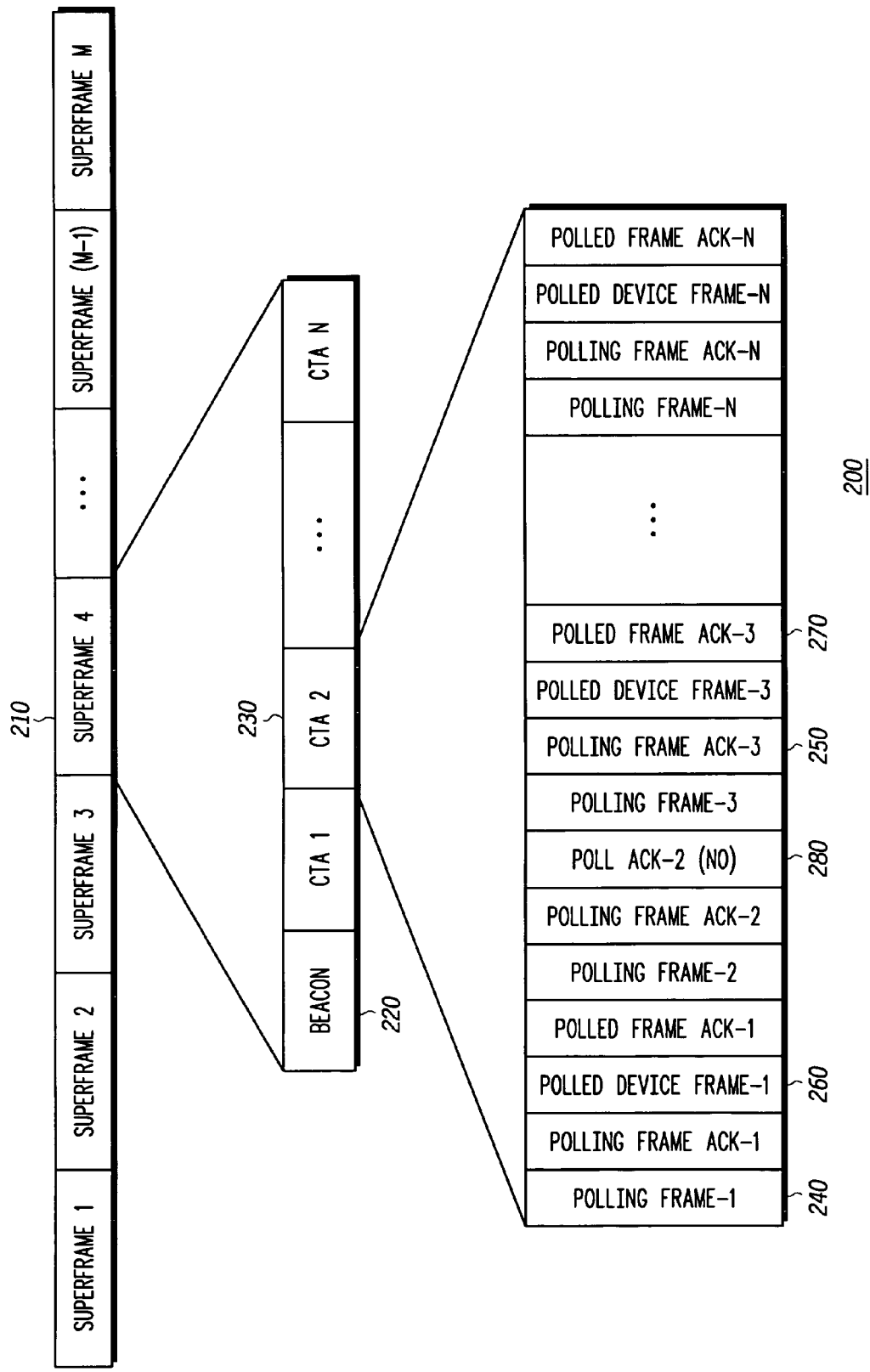
FIG. 2 is a block diagram of a TDMA scheme including superframes and channel time allocations for passing data and acknowledgement frames using an explicit polling scheme, according to a disclosed embodiment of the present invention.

FIG. 2 is a block diagram of a TDMA scheme including superframes and channel time allocations for passing data and acknowledgement frames using an explicit polling scheme, according to a disclosed embodiment of the present invention. As shown in FIG. 2, the available transmission time 200 is broken up into a plurality of consecutive superframes 210. Each individual superframe 210 in this embodiment includes a beacon period 220 and one or more channel time allocations (CTAs) 230. Each CTA 230 can be used to pass a variety of frame types, including polling frames 240, polling frame acknowledgement frames 250, polled device frames 260, polled frame acknowledgement frames 270, and poll acknowledgement frames 280.

The beacon period 220 is set aside for the coordinator 110 to send a beacon frame out to the non-coordinator devices 121-125 in the network 100. Such a beacon frame will include information for organizing the operation of devices within the superframe 210. Each non-coordinator device 121-125 knows how to recognize a beacon period 220 prior to joining the network 100, and uses the beacon 220 both to identify an existing network 100 and to coordinate communication within the network 100.

The beacon frame provides information required by the devices 121-125 in the network 100 regarding how the CTAs 230 will be allocated. In particular, it notes which device 110, 121-125 will control transmissions in a given CTA 230 to prevent any two devices from interfering.

The CTAs 230 are portions of the superframe that are set aside for passing data between devices 110, 121-125. And although FIG. 2 discloses multiple CTAs 230, some embodiments could provide all of a superframe 210 after a beacon 220 to be one large CTA 230. CTAs 230 are assigned in accordance with information set forth in the beacon 220. The size of the CTAs 230 can vary by embodiment, but each should be large enough to transmit one or more data frames. The data frames can be transmitted in a contention environment or a contention free environment in different embodiments. As shown in FIG. 2, the disclosed embodiment provides that at least some of the CTAs 230 are configured to allow data frames and acknowledgement frames to be sent using a polling scheme.

A polling frame 240 is a data frame used by a master device in control of the current CTA 230 (which may be a coordinator device 110 or may be a non-coordinator device 121-125) to send data to a first slave device, while simultaneously polling a second slave device (which may or may not be the same as the destination device) to see if it has a data frame to be sent.

A polling frame acknowledgement frame 250 is an acknowledgement frame sent from a first slave device (which may be a coordinator device 110 or a non-coordinator device 121-125) to the master device indicating receipt of a polling frame 240.

A polled device frame 260 is a data frame used by a second slave device (which may be the same as the first slave device)

to send data to a target device (which may be the master device or another slave device).

A polled frame acknowledgement frame 270 is an acknowledgement frame sent from the target device to the second slave device indicating receipt of a polled device frame 260.

A poll acknowledge 280 is an acknowledgement frame sent from a polled second slave device to the master device in the situation where the second slave device does not have a data frame to send.

Although specific polling frames 240, polling frame acknowledgement frames 250, polled device frames 260, polled frame acknowledgement frames 270, and poll acknowledgement frames 280 are disclosed in the embodiment of FIG. 1, alternate embodiments could use a different acknowledgement policy, using acknowledgement frames in more or fewer situations.

The superframes 210 are fixed time constructs that are repeated in time. The specific duration of the superframe 210 is described in the beacon 220. In fact, the beacon 220 generally includes information regarding how often the beacon 220 is repeated, which effectively corresponds to the duration of the superframe 210. The beacon 220 also contains information regarding the network 100, such as the identity of the transmitters and receivers assigned to each assigned CTA 230, the necessary transmission parameters for signals within a CTA 230, and the identity of the coordinator 110.

The system clock for the network 100 is preferably synchronized through the generation and reception of the beacons 220. Each non-coordinator device 121-125 will store a synchronization point time upon successful reception of a valid beacon 220, and will then use this synchronization point time to adjust its own timing.

Data Frames and Acknowledgement Frames for Explicit Polling

Figure 3:
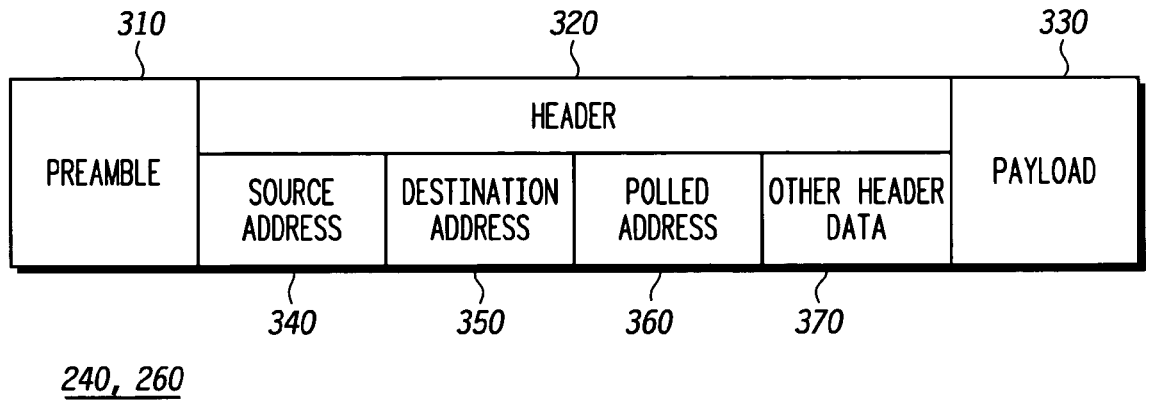
FIG. 3 is a block diagram of a data frame for use with an explicit polling scheme according to a disclosed embodiment of the present invention.
Figure 4:
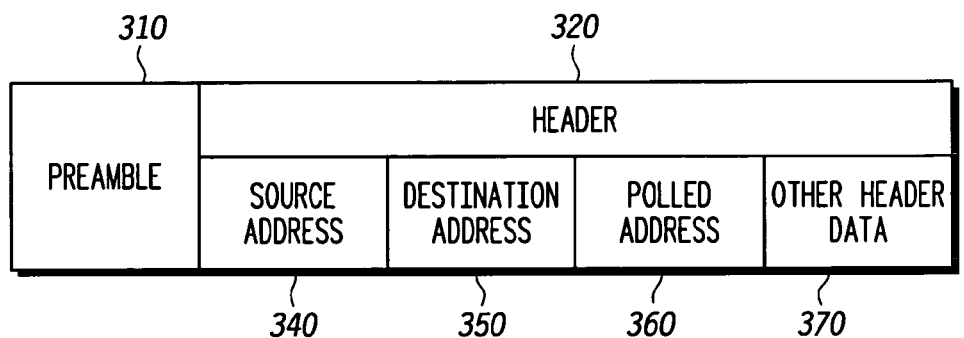
FIG. 4 is a block diagram of an acknowledgement frame for use with an explicit polling scheme according to a disclosed embodiment of the present invention.

FIG. 3 is a block diagram of a data frame for use with an explicit polling scheme according to a disclosed embodiment of the present invention. The data frame 240, 260 disclosed in FIG. 3 can serve as either the polling frame 240 or the polled device frame 260 of FIG. 1. FIG. 4 is a block diagram of an acknowledgement frame for use with an explicit polling scheme according to a disclosed embodiment of the present invention. The acknowledgement frame 250, 270, 280 disclosed in FIG. 4 can serve as one of the polling frame acknowledgement frame 250, the polled frame acknowledgement frame 270, or the poll acknowledgement frame 280 of FIG. 1.

Each data frame 240, 260 is preferably made up of a series of wavelets (or radio symbols), with information in the frame 240, 260 being represented by the wavelets or groups of wavelets. As shown in FIG. 3, the data frame 240, 260 includes a preamble 310, a header 320, and a payload 330. The header 320 can include a source address 340, a destination address 350, a polled address 360, and other header data 370.

Each acknowledgement frame 250, 270, 280 is preferably made up of a series of wavelets, with information in the acknowledgement frame 250, 270, 280 being represented by the wavelets or groups of wavelets called code words. As shown in FIG. 4, the acknowledgement frame 250, 270, 280 includes a preamble 310 and a header 320. The header 320 can include a source address 340, a destination address 350, a polled address 360, and other header data 370.

The preamble 310 is a known sequence of bits used to allow a destination device to properly lock onto the signal. No substantive data is sent in the preamble 310, since the destination device is still getting its timing synchronized with that of the transmitting device while the preamble 310 is being sent.

In a disclosed embodiment the preamble 310 comprises a pseudo-noise (PN) sequence that can be easily and repeatably generated, and that looks random to prevent spectral lines. In a preferred embodiment the PN sequence is generated using a $17^{th}$ order polynomial (e.g., the $17^{th}$ order trinomial: $x^{17}+x^{12}+1$). This can be implemented using a length 17 shift register with taps at the appropriate points leading to an XOR gate. The shift register can then be filled with a known seed value to start the shift register producing the PN sequence. In a preferred embodiment the start seed may be 1_1111_1111_1111_1111 or 0_0000_0000_0000_0100, i.e., the appropriate bit values are placed in parallel into corresponding shift registers.

The header 320 includes information about the device transmitting the frame 240, 250, 260, 270, and 280 (i.e., the source device), the intended recipient of the frame 240, 250, 260, 270, and 280 (i.e., the destination device), the device being polled (if any), and other identifying information. The header 320 can include a MAC header and a PHY header.

In particular, the source address 340 identifies the device transmitting the frame 240, 250, 260, 270, or 280; the destination address 350 identifies the intended recipient of the frame 240, 250, 260, 270, or 280; and the polled address 360 identifies the device being polled. The destination address 350 may identify a single device 110, 121-125 or may identify two or more devices 110, 121-125 at the same time (e.g., a broadcast address or a multicast address). These device addresses can be done by MAC address, network address, or any other suitable method.

For every frame 240, 250, 260, 270, and 280 there will always be an entry for source address 340 and destination address 350. However, not every frame 240, 250, 260, 270, and 280 will have an entry for polled address 360. For example, in the disclosed embodiment any slave device sending a polled device frame 260 will not identify a polled device. In this case, the entry in the header 320 for the polled address 360 will have a null value.

The other header data 370 could include information such as payload rate, an indicator as to whether a device has more data to transmit, a frame type, sequence number, fragment number, frame length, stream index, protocol version, acknowledgement policy, etc.

The payload 330 includes the substantive information being transmitted by the data frame 240, 260. This can be data if the frame is a data frame, management information if it is a management frame, etc.

An acknowledgement frame 250, 270, 280 is used to provide an indication that a data frame 240, 260 has been successfully received. As such it needs no payload. Its very existence implicitly provides the information it must pass, i.e., that the previous data frame 240, 260 was successfully received.

Although in FIGS. 3 and 4 the elements in the header 320 are shown as being in a particular order, this order may be varied in alternate embodiments. Furthermore, the other header data 370 can be split up into multiple portions and interleaved between the source address 340, destination address 350, and polled address 360, if desired.

Although not shown, the frames 240, 250, 260, 270, and 280 disclosed in FIGS. 3 and 4 may include one or more check sequences (e.g. a cyclic redundancy check (CRC) to check for transmission errors. For example, any frame 240, 250, 260, 270, and 280 could include a header check sequence at the end of the header 320 to perform a CRC on the header 320.

Furthermore, a data frame 240, 260 may have a frame check sequence at the end of the payload 330 to perform a CRC on the entire data frame 240, 260.

Polling Scheme with Explicit Polling

Figure 5:
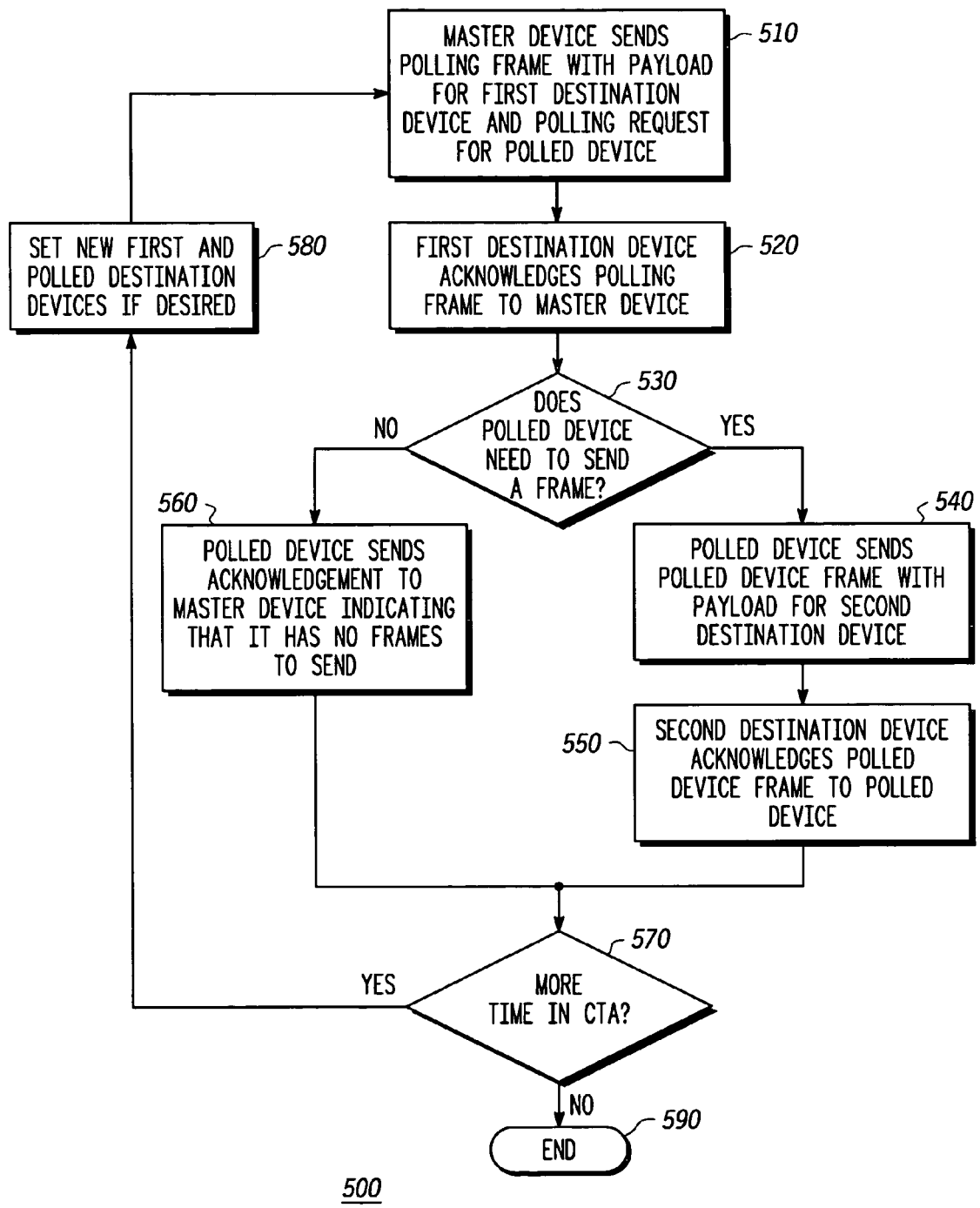
FIG. 5 is a flow chart of an explicit polling scheme according to a disclosed embodiment of the present invention.

FIG. 5 is a flow chart of an explicit polling scheme according to a disclosed embodiment of the present invention. As shown in FIG. 5, a master device initially sends a polling frame 240 with a first payload for a first destination device and a polling request for a polled device. (510) In this polling frame 240, the source address 340 identifies the master device; the destination address 350 identifies the first destination device; the polled address 360 identifies the polled device; and the payload 330 includes the first payload for the first destination device.

The first destination device receives the polling frame 240, processes its payload 330, and acknowledges it to the master device through a polling frame acknowledgement frame 250. (520)

Meanwhile, the polled device hears the polling frame 240 and determines whether it needs to send a frame to any other device. (530)

If the polled device does need to send a frame, it sends a polled device frame 260 containing a second payload to a second destination device. (540) In this polled device frame 260, the source address 340 identifies the polled device; the destination address 350 identifies the second destination device; the polled address 360 contains a null value (since no further devices are being polled); and the payload 330 includes the second payload for the second destination device.

The second destination device then receives the polled device frame 260, processes its payload 330, and acknowledges it to the polled device through a polled frame acknowledgement frame 270. (550)

If the polled device does not need to send a frame to another device, it immediately sends a poll acknowledgement frame 280 to the master device indicating that it has no frames to send. (560) This allows the master device to otherwise use the frame slot that would have been assigned to the polled device.

The master device then determines whether there is anymore time left in the current CTA 230. (570) If there is more time in the CTA 230, the master device sets new first and polled destination devices if desired (though one or both could remain the same) (580) and sends out a new polling frame. (510) If there is no more time left in the CTA 230, then processing of the CTA ends. (590)

Figure 6:
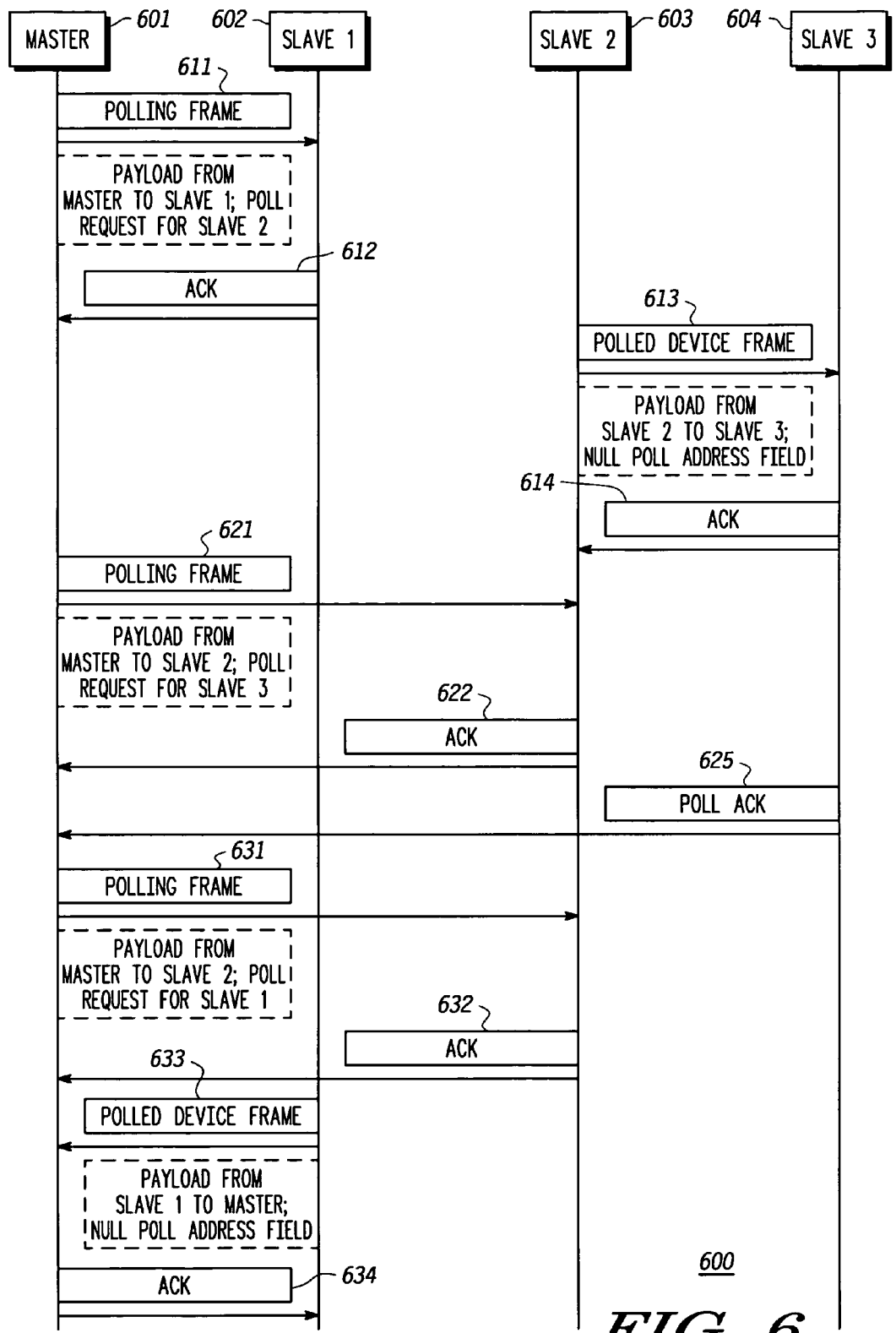
FIG. 6 is a message sequence chart of a portion of an exemplary channel time allocation using an explicit polling scheme according to a disclosed embodiment of the present invention.

FIG. 6 is a message sequence chart of a portion of an exemplary channel time allocation using an explicit polling scheme according to a disclosed embodiment of the present invention. As shown in FIG. 6, this disclosed embodiment has a master device 601 and three slave devices 602, 603, and 604.

In this embodiment the master device 601 is a device that controls the current CTA 230. It may be either a coordinator device 110 or a non-coordinator device 121-125, depending upon the circumstances. In fact, if a non-coordinator device 121-125 controls the CTA 230, the coordinator device 110 might be one of the slave devices 602-604.

In addition, although three slave devices 602-604 are disclosed in this embodiment, alternate embodiments could use more or fewer slaves for a given CTA 230. In fact, the number of slave devices could vary from CTA 230 to CTA 230.

And although the various polling frames, polling frame acknowledgement frames, polled device frames, polled frame acknowledgement frames, and poll acknowledgement frames described with respect to FIG. 6 are given specific reference numbers, they each operate as a corresponding polling frames 240, polling frame acknowledgement frames 250, polled device frames 260, polled frame acknowledgement frames 270, or poll acknowledgement frames 280, as disclosed in FIGS. 3 and 4.

In the exemplary operation disclosed in FIG. 6, the master begins by sending a first polling frame 611 from the master device 601 to the first slave device 602, including a poll for the second slave device 603. In this first polling frame 611, a source address 340 identifies the master device 601; a destination address 350 identifies the first slave device 602; a polled address 360 identifies the second slave device 603; and a payload 330 includes the first payload for the first slave device 602.

After receiving the first polling frame 611 from the master device 601, the first slave device 602 sends a first polling frame acknowledgement frame 612 back to the master device 601. In this first polling frame acknowledgement frame 612, a source address 340 identifies the first slave device 602; a destination address 350 identifies the master device 601; and a polled address 360 has a null value.

Then, the second slave device 603, responding to the first polling frame 611, which identified the second slave device 603 as the polled device, sends a first polled device frame 613 to the third slave device 604. In this first polled device frame 613, a source address 340 identifies the second slave device 603; a destination address 350 identifies the third slave device 604; a polled address 360 has a null value; and a payload 330 includes the second payload for the third slave device 604.

After receiving the first polled device frame 613 from the second slave device 603, the third slave device 604 sends a first polled frame acknowledgement frame 614 back to the second slave device 603. In this first polled frame acknowledgement frame 614, a source address 340 identifies the third slave device 604; a destination address 350 identifies the second slave device 603; and a polled address 360 has a null value.

After the first polled frame acknowledgement frame 614 has been sent (thus ending the polled transmission operation), the master device 601 starts the polling scheme over again by sending a second polling frame 621 from the master device 601 to the second slave device 603, including a poll for the third slave device 604. In this second polling frame 621, a source address 340 identifies the master device 601; a destination address 350 identifies the second slave device 603; a polled address 360 identifies the third slave device 604; and a payload 330 includes the third payload for the second slave device 602.

After receiving the second polling frame 621 from the master device 601, the second slave device 603 sends a second polling frame acknowledgement frame 622 back to the master device 601. In this second polling frame acknowledgement frame 622, a source address 340 identifies the second slave device 603; a destination address 350 identifies the master device 601; and a polled address 360 has a null value.

The third slave device 604, responding to the second polling frame 621, knows that it can send a frame if it has one. However, in this example, the third slave device 604 has no frames to send. As a result, it instead sends a poll acknowledgment frame 625 indicating to the master device 601 that it does not need to send any data. In this poll acknowledgement frame 625, a source address 340 identifies the third slave device 604; a destination address 350 identifies the master device 601; and a polled address 360 has a null value.

After receiving the poll acknowledgement frame 625 (which indicates that no polled device frame will be sent), the master device 601 starts the polling scheme over again by sending a third polling frame 631 from the master device 601 to the second slave device 603, including a poll for the first slave device 604. In this third polling frame 631, a source address 340 identifies the master device 601; a destination address 350 identifies the second slave device 603; a polled address 360 identifies the first slave device 602; and a payload 330 includes the fourth payload for the second slave device 602.

After receiving the third polling frame 631 from the master device 601, the second slave device 603 sends a third polling frame acknowledgement frame 632 back to the master device 601. In this third polling frame acknowledgement frame 632, a source address 340 identifies the second slave device 603; a destination address 350 identifies the master device 601; and a polled address 360 has a null value.

The first slave device 602, having also heard the third polling frame 631, which identified the first slave device 602 as the polled device, then sends a second polled device frame 633 to the master device 601. In this second polled device frame 633, a source address 340 identifies the first slave device 602; a destination address 350 identifies the master device 601; a polled address 360 has a null value; and a payload 330 includes the fourth payload for the master device 601.

After receiving the second polled device frame 633 from the first slave device 602, the master device 601 sends a second polled device frame acknowledgement frame 634 back to the first slave device 602. In this second polled device frame acknowledgement frame 634, a source address 340 identifies the master device 601; a destination address 350 identifies the first slave device 602; and a polled address 360 has a null value.

The disclosed polling scheme can continue in this manner until the current CTA 230 ends. And as it proceeds, the identities of the various destination and polled devices can be mixed up as desired. The master device 601 can use a fair and distributed approach to polling the slave devices 602-604, or it can poll one or more of the slave devices 602-604 more often than the others. For example, if one of the slave devices 602-604 is sending streaming data, the master device 601 might guarantee it a certain frequency of polling, regardless of the number of other devices.

Furthermore, the polling distribution can be varied dynamically in some embodiments to account for changing needs. For example, if one slave device repeatedly sends a poll acknowledgment frame 280 indicating that it has no data frames to send, the master device 601 might poll that slave device less frequently than the others. In fact, in some cases a master device might stop polling a given slave device until the next CTA 230, or even the next superframe 210.

In some embodiments the master device could maintain a first-in-first-out (FIFO) buffer for addresses of devices that have indicated that they have data waiting to transmit. This would allow the master to fairly allocate polls. In other embodiments, the master device could maintain two FIFO buffers of device addresses. One could indicate asynchronous data to be transferred and the other could indicate isochronous data to be transferred. This would allow the master to both fairly allocate polls, as well as maintain quality of service for isochronous data.

It should be noted that the particular frame addresses in this embodiment are for purposes of example only. The particular transfer of frames could be varied as needed in different embodiments. However for this embodiment the master device 601 is the only device that can send out polling frames 240.

Polling Scheme with Impilicit Acknowledgement

The embodiment described above with respect to FIGS. 2 to 6 discloses a polling scheme using explicit polling. In other words, each polling frame explicitly polls a particular device, where the polled device is indicated in a specific header field. However, a polling scheme using implicit polling could also be used, where the pollee is always the destination device for the polling data frame. In this scheme, the master implicitly polls whatever device it sends a polling frame to.

Figure 7:
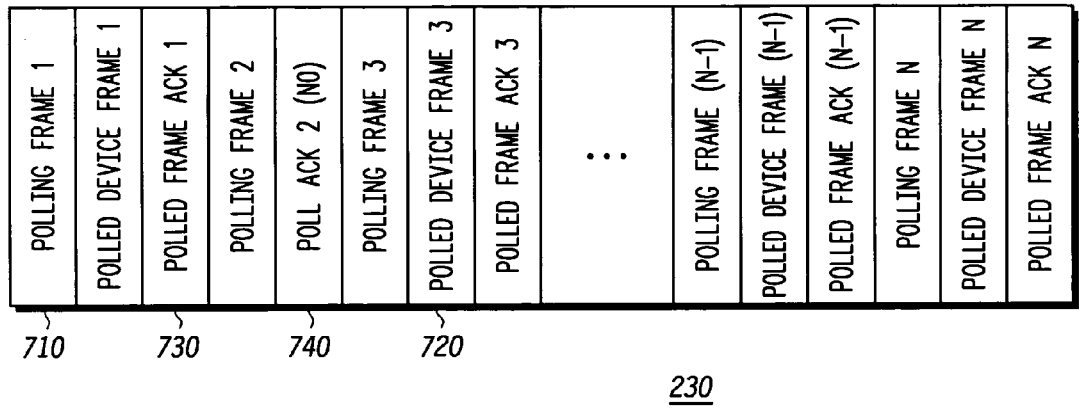
FIG. 7 is a block diagram of a channel time allocation for passing data and acknowledgement frames using an implicit polling scheme, according to a disclosed embodiment of the present invention.

FIG. 7 is a block diagram of a channel time allocation for passing data and acknowledgement frames using an implicit polling scheme, according to a disclosed embodiment of the present invention. As shown in FIG. 7, this CTA 230 includes only polling frames 710, polled device frames 720, and poll acknowledgment frames 730.

A polling frame 710 is a data frame used by a master device in control of the current CTA 230 (which may be a coordinator device 110 or may be a non-coordinator device 121-125) to send data to a slave device, while simultaneously polling the slave device to see if it has a data frame to be sent.

A polled device frame 720 is a data frame used by a polled slave device to send data to a target device (which may be the master device or another slave device).

A polled frame acknowledgement frame 730 is an acknowledgement frame sent from the target device to the polled slave device indicating receipt of a polled device frame 720.

A poll acknowledge frame 740 is an acknowledgement frame sent from a polled slave device to the master device in the situation where the polled slave device does not need to send a data frame.

No explicit acknowledgement frame is needed for the polling frame 710 if the polled device has data to send. In this case the polled device frame 720 serves to implicitly acknowledge the polling frame 710. This can work because the destination slave device for the polling frame 710 is also the polled device for the polling frame 710.

Data Frames and Acknowledgement Frames for Implicit Polling

Figure 8:
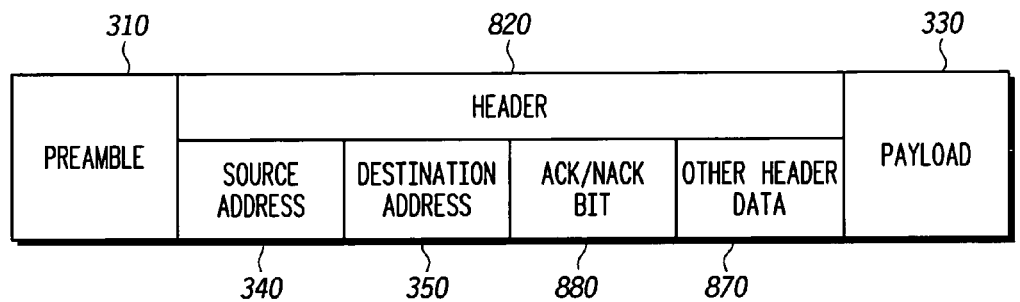
FIG. 8 is a block diagram of a data frame for use with an implicit polling scheme, according to a disclosed embodiment of the present invention.

FIG. 8 is a block diagram of a data frame for use with an implicit polling scheme, according to a disclosed embodiment of the present invention. The data frame 710, 720 disclosed in FIG. 8 can serve as either the polling frame 710 or the polled device frame 720 of FIG. 7.

Figure 9:
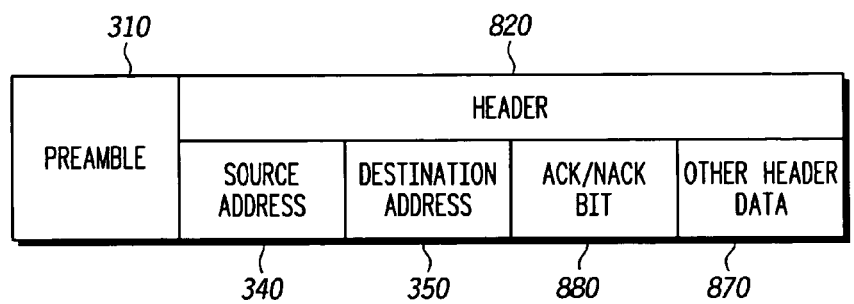
FIG. 9 is a block diagram of an acknowledgement frame for use with an implicit polling scheme, according to a disclosed embodiment of the present invention.

FIG. 9 is a block diagram of an acknowledgement frame for use with an implicit polling scheme, according to a disclosed embodiment of the present invention. The acknowledgement frame 730, 740 disclosed in FIG. 9 can serve as either the polled frame acknowledgement frame 730 or the poll acknowledgement frame 740 of FIG. 7.

Each data frame 710, 720 is preferably made up of a series of wavelets, with information in the frame 710, 720 being represented by the wavelets or groups of wavelets called code words. As shown in FIG. 8, the data frame 710, 720 includes a preamble 310, a header 820, and a payload. 330. The header 820 can include a source address 340, a destination address 350, an ACK/NACK bit 880, and other header data 870.

Each acknowledgement frame 730, 740 is preferably made up of a series of wavelets, with information in the frame 730, 740 being represented by the wavelets or groups of wavelets called code words. As shown in FIG. 9, the acknowledgement frame 730, 740 includes a preamble 310 and a header 820. The header 820 can include a source address 340, a destination address 350, an ACK/NACK bit 880, and other header data 870.

The preamble 310 is a known sequence of bits used to allow a destination device to properly lock onto the signal, as described above with respect to FIG. 3.

The header 820 includes information about the device transmitting the frame 710, 720, 730, and 740 (i.e., the source device), the intended recipient of the frame 710, 720, 730, and 740 (i.e., the destination device), whether the frame is acknowledging a previous frame, and other identifying information.

As with the header 320 of an explicit polling scheme shown in FIG. 3, the source address 340 and the destination address 350 in the an implicit polling scheme shown in FIG. 8 operate in the same manner. In particular, the source address 340 identifies the device transmitting the frame 710, 720, 730, or 740, and the destination address 350 identifies the intended recipient of the frame 710, 720, 730, or 740.

The ACK/NACK bit 880 is used in an implicit polling scheme to indicate whether a transmitting device successfully received a previous frame from the intended recipient device. One value of the ACK/NACK bit 880 will be used when the transmitting device wishes to acknowledge the last frame sent by the receiving device. The other value of the ACK/NACK bit 880 will be used when the transmitting device needs to indicate that the payload from the previous frame from the target device was not properly received. The ACK/NACK bit 880 can indicate that a payload 330 was not successfully received even though the device successfully decoded the header 320 of a received frame. In this case the original recipient may recover sufficient information to know when it may transmit next, but not the data in the frame's payload 330. In this case it will set the ACK/NACK bit 880 to indicate unsuccessful receipt, causing the original transmitter to send it again.

The other header data 870 could include information such as payload rate, an indicator as to whether a device has more data to transmit, a frame type, sequence number, fragment number, frame length, stream index, protocol version, acknowledgement policy, etc.

The payload 330 includes the substantive information being transmitted by the data frame 710, 720. As noted with respect to FIG. 3, this can be data if the frame is a data frame, management information if it is a management frame, etc.

An acknowledgement frame 730, 740 is used to provide an indication that a data frame 710, 720 has been successfully received. As such it needs no payload. Its very existence implicitly provides the information it must pass, i.e., that the previous data frame 710, 720 was received.

As with the frame of FIG. 3, although the elements in the header 820 are shown as being in a particular order, this order may be varied in alternate embodiments. Furthermore, the other header data 870 can be split up into multiple portions and interleaved between the source address 340, destination address 350, and ACK/NACK bit 780, if desired.

Also, although not shown, the frames 710, 720, 730, and 740 disclosed in FIGS. 8 and 9 may include one or more check sequences (e.g. a cyclic redundancy check (CRC) to check for transmission errors. For example, any frame 710, 720, 730, or 740 could include a header check sequence at the end of the header 820 to perform a CRC on the header 820. Furthermore, a data frame 710, 720 may have a frame check sequence at the end of the payload 330 to perform a CRC on the entire data frame 710, 720.

Polling Scheme with Implicit Polling

Figure 10:
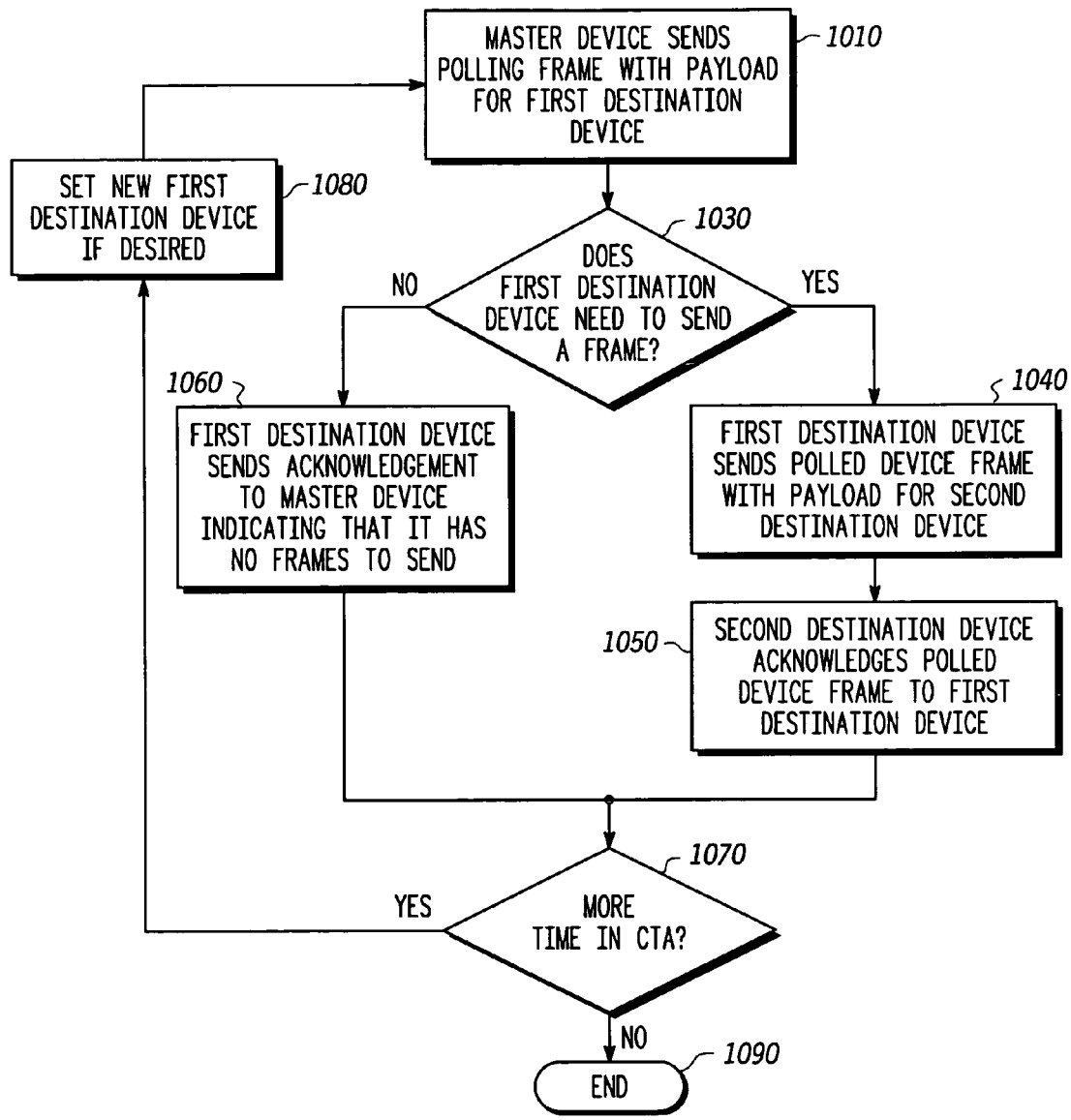
FIG. 10 is a flow chart of an implicit polling scheme according to a disclosed embodiment of the present invention.

FIG. 10 is a flow chart of an implied acknowledgement polling scheme according to a disclosed embodiment of the present invention. As shown in FIG. 10, a master device initially sends a polling frame 710 with a first payload for a first destination device. (1010) In this polling frame 710, the source address 340 identifies the master device; the destination address 350 identifies the first destination device (which is also the implied polled device); the ACK/NACK bit is set to indicate no acknowledgement (NACK), since this is the first frame sent during a CTA 230; and the payload 330 includes the first payload for the first destination device.

The first destination device receives the polling frame 710, processes its payload 330, and determines whether it needs to send a data frame to any device. (1030) The first destination device does not need to be explicitly polled. The fact that it was the destination device for a polling frame 710 serves as an implicit poll for the first destination device.

If the first destination device does need to send a frame, it sends a polled device frame 720 containing a second payload to a second destination device. (1040) The second destination device may be any permissible device, and may even be the master device.

In this polled device frame 720, the source address 340 identifies the first destination device; the destination address 350 identifies the second destination device; the ACK/NACK bit 880 indicates whether the first destination device properly received the first payload; and the payload 330 includes the second payload for the second destination device.

The second destination device then receives the polled device frame 720, processes its payload 330, and acknowledges it to the first destination device through a polled frame acknowledgement frame 730. (1050)

And although the polled device frame 720 is being sent to the second destination device, the master will also be able to hear it and will be able to read the ACK/NACK bit 880 to receive an acknowledgment of the polling frame.

If the first destination device does not need to send a frame to another device, it immediately sends a poll acknowledgement frame 740 to the master device indicating that it has no frames to send. (1060) In the poll acknowledgement frame 740, the source address 340 identifies the first destination device; the destination address 350 identifies the master device; and the ACK/NACK bit 880 indicates whether the first destination device properly received the first payload.

By thus sending an immediate indication that it does not need the allocated part of the CTA 230, the first destination device allows the master device to use the frame slot that would have otherwise have been assigned to the first destination device.

The master device then determines whether there is anymore time left in the current CTA 230. (1070) If there is more time in the CTA 230, the master device sets new first destination device if desired (though in some cases it could remain the same) (1080) and sends a new polling frame. (1010) If there is no more time left in the CTA 230, then processing of the CTA ends. (1090)

Figure 11:
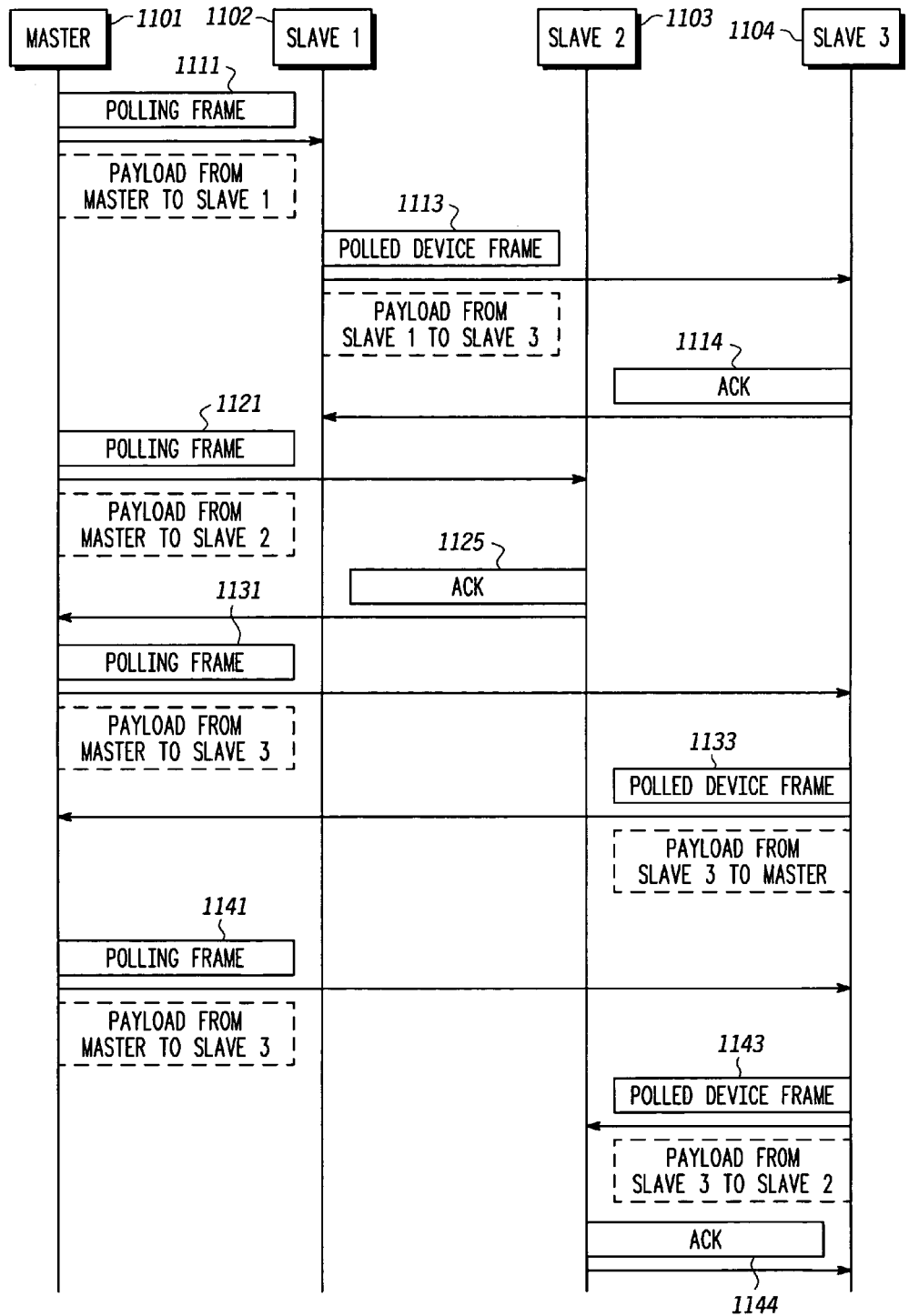
FIG. 11 is a message sequence chart of a portion of an exemplary channel time allocation using an implicit polling scheme according to a disclosed embodiment of the present invention.

FIG. 11 is a message sequence chart of a portion of an exemplary channel time allocation using an implied acknowledgement polling scheme according to a disclosed embodiment of the present invention. As shown in FIG. 6, this disclosed embodiment has a master device 1101 and three slave devices 1102, 1103, and 1104.

In this embodiment the master device 1101 is a device that controls the current CTA 230. It may be either a coordinator device 110 or a non-coordinator device 121-125, depending upon the circumstances. In fact, if a non-coordinator device 121-125 controls the CTA 230, the coordinator device 110 might be one of the slave devices 1102-1104.

In addition, although three slave devices 1102-1104 are disclosed in this embodiment, alternate embodiments could use more or fewer slaves for a given CTA 230. In fact, the number of slave devices could vary from CTA 230 to CTA 230.

And although the various polling frames, polling frame acknowledgement frames, polled device frames, polled frame acknowledgement frames, and poll acknowledgement frames described with respect to FIG. 11 are given specific reference numbers, they each operate as a corresponding polling frames 710, polled device frames 720, polled frame acknowledgement frames 730, and poll acknowledgement frames 740 disclosed in FIGS. 8 and 9.

In the exemplary operation disclosed in FIG. 11, the master device 1101 begins by sending a first polling frame 1111 to the first slave device 1102. In this first polling frame 1111, a source address 340 identifies the master device 1101; a destination address 350 identifies the first slave device 1102; an ACK/NACK bit 880 indicates no acknowledgement; and a payload 330 includes the first payload for the first slave device 1102.

After receiving the first polling frame 1111 from the master device 1101, the first slave device 1102 processes the first payload and determines whether it has any data to send, since it has now been implicitly polled. In this example, the first slave device 1101 has frames to send. As a result, it sends a first polled device frame 1113 to the third slave device 1104. In this first polled device frame 1113, a source address 340 identifies the first slave device 1103; a destination address 350 identifies the third slave device 1104; an ACK/NACK bit 880 indicates whether the first slave device 1102 successfully received the first payload; and a payload 330 includes the second payload for the third slave device 1104.

After receiving the first polled device frame 1113 from the first slave device 1103, the third slave device 1104 processes the second payload and sends a first polled frame acknowledgement frame 1114 back to the first slave device 1102. In this first polled frame acknowledgement frame 1114, a source address 340 identifies the third slave device 1104; a destination address 350 identifies the first slave device 1102; and the ACK/NACK bit 880 indicates whether the third slave device successfully received the second payload.

After the first polled frame acknowledgement frame 1114 has been sent (thus ending the polled transmission operation), the master device 1101 starts the polling scheme over again by sending a second polling frame 1121 from the master device 1101 to the second slave device 1103. In this second polling frame 1121, a source address 340 identifies the master device 1101; a destination address 350 identifies the second slave device 1103; an ACK/NACK bit 880 indicates no acknowledgement (since the master device 1101 has not received a payload yet); and a payload 330 includes the third payload for the second slave device 1102.

After receiving the second polling frame 1121 from the master device 1101, the second slave device 1103 processes the third payload and determines whether it has any data to send, since it has now been implicitly polled. In this example, the second slave device 1103 has no frames to send. As a result, it instead sends a poll acknowledgment frame 1125 to the master device 1101 indicating that it does not need to send any data. In this poll acknowledgement frame 1125, a source address 340 identifies the second slave device 1103; a destination address 350 identifies the master device 1101; and an ACK/NACK bit 880 indicates whether the second slave device 1102 successfully received the third payload.

There is no need for the second slave device 1102 to provide any additional information regarding its decision not to use the offered portion of the CTA 230. The fact that the second slave device 1102 sent a poll acknowledgment frame 1125 implicitly indicates that the second slave device 1102 has no data to send.

After receiving the poll acknowledgement frame 1125 (which indicates that no polled device frame will be sent), the master device 1101 starts the polling scheme over again by sending a third polling frame 1131 from the master device 1101 to the third slave device 1104. In this third polling frame 1131, a source address 340 identifies the master device 1101; a destination address 350 identifies the third slave device 1103; an ACK/NACK bit 880 indicates no acknowledgement (since the master device 1101 has not received a payload yet); and a payload 330 includes the fourth payload for the third slave device 1103.

After receiving the third polling frame 1131 from the master device 1101, the third slave device 1104 processes the fourth payload and determines whether it has any data to send, since it has now been implicitly polled. In this example, the third polling frame does have data to transmit, and sends a second polled device frame 1133 to the master device 1101. In this second polled device frame 1133, a source address 340 identifies the third slave device 1104; a destination address 350 identifies the master device 1101; an ACK/NACK bit 880 indicates whether the third slave device 1103 successfully received the fourth payload; and a payload 330 includes the fifth payload for the master device 1101.

After receiving the third polled device frame 1133, the master device 1101 processes the fifth payload and starts the polling scheme over again by sending a fourth polling frame 1141 from the master device 1101 to the third slave device 1104. In this third polling frame 1131, a source address 340 identifies the master device 1101; a destination address 350 identifies the third slave device 1104; an ACK/NACK bit 880 indicates whether the master device 1101 has successfully received the fifth payload; and a payload 330 includes the sixth payload for the third slave device 1103.

Because the master device 1101 was the destination for the second polled device frame 1133, the processing was able to avoid the need to send a polled frame acknowledgement frame 730 in response to that data frame. Instead, the master device 1101 was simply able to use the ACK/NACK bit 880 in the fourth polling frame 1141 as an acknowledgement.

After receiving the fourth polling frame 1141 from the master device 1101, the third slave device 1104 processes the sixth payload and determines whether it has any data to send, since it has now been implicitly polled. In this example, the third polling frame does have data to transmit, and sends a third polled device frame 1143 to the master device 1101. In this third polled device frame 1143, a source address 340 identifies the third slave device 1104; a destination address 350 identifies the second slave device 1103; an ACK/NACK bit 880 indicates whether the third slave device 1103 successfully received the sixth payload; and a payload 330 includes the seventh payload for the second slave device 1102.

After receiving the third polled device frame 1143 from the third slave device 1104, the second slave device 1103 processes the seventh payload and sends a second polled frame acknowledgement frame 1144 back to the third slave device 1104. In this second polled frame acknowledgement frame 1144, a source address 340 identifies the second slave device 1103; a destination address 350 identifies the second slave device 1103; and the ACK/NACK bit 880 indicates whether the second slave device 1103 successfully received the seventh payload.

The disclosed polling scheme can continue in this manner until the current CTA 230 ends. And as it proceeds, the identities of the various destination and polled devices can be mixed up as desired. The master device 1101 can use a fair and distributed approach to polling the slave devices 1102-1104, or it can poll one or more of the slave devices 1102-1104 more often than the others. For example, if one of the slave devices 1102-1104 is sending streaming data, the master device 1101 might guarantee it a certain frequency of polling.

Furthermore, the polling distribution can be varied dynamically in some embodiments to account for changing needs. For example, if one slave device repeatedly sends a poll acknowledgment frame 740 indicating that it has no data frames to send, the master device 1101 might poll that slave device less frequently than the others. In fact, in some cases a master device might stop polling a given slave device until the next CTA 230, or even the next superframe 210.

Also, it may be necessary in this embodiment for the master device 1101 to send out one or more polling frames 710 with null payloads 330. If the master device 1101 has no data to send to a device, but must poll that device, it may need to send a null data frame to implicitly poll that target device.

It should be noted that the particular frame addresses in this embodiment are for purposes of example only. The particular transfer of frames could be varied as needed in different embodiments. However for this embodiment the master device 1101 is the only device that can send out polling frames 710.

Other Applications

The polling schemes can be used for in some implementations for association. In this case a master device can poll a broadcast address soliciting other devices to join the network. Unassociated slave devices can respond to this poll. If they receive an acknowledgement to their response, the slaves can join the network. Otherwise they must wait a number of new polls before responding again.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings.

The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

In addition, although the embodiments described in this document are in the context of a WPAN (or piconet), it should be understood that the present invention also applies to other settings where bandwidth is to be shared among several users, such as, for example, wireless local area networks (WLAN), other appropriate wireless network, or any wired or wireless transmission scheme in which bandwidth must be shared.

What is claimed is:

1. A method of a master device allocating a channel time in a transmission channel, comprising:
    sending a polling frame over the transmission channel from the master device to a current destination slave device and a current polled slave device, the polling frame including a current destination slave device address of the destination slave device, a current polled slave device address of the polled slave device, and a current payload for the current destination slave device;
    receiving a poll acknowledgement frame over the transmission channel if the current polled slave device does not wish to transmit data;
    waiting for a set duration if no poll acknowledgement frame is received, the set duration being at least as long as a data frame duration;
    setting the current destination device address to be equal to a new destination device address identifying a new destination device;
    setting the current polled device address to be equal to a new polled slave device address identifying a new polled device; and
    setting the current payload to be equal to a new payload;
    repeating sending a polling frame, receiving a poll acknowledgement frame, waiting for a set duration, setting the current destination device address, and setting the current polled slave device address.

2. A method of a master device allocating a channel time, as recited in claim 1, wherein the master device continues to repeat sending a polling frame, receiving a poll acknowledgement frame, waiting for a set duration, setting the current destination device address, setting the current polled slave device address, and setting the current payload until a current channel time allocation ends.

3. A method of a master device allocating a channel time, as recited in claim 1, wherein the new destination device address is the same as the current destination device address.

4. A method of a master device allocating a channel time, as recited in claim 1, wherein the new polled device address is the same as the current polled device address.

5. A method of a master device allocating a channel time, as recited in claim 1, wherein the set duration is a duration of one or more data frames.

6. A method of a master device allocating a channel time, as recited in claim 1, further comprising receiving a polling frame acknowledgement frame from the destination device after sending the polling frame.

7. A method of a master device allocating a channel time, as recited in claim 6, wherein the polling frame acknowledgement frame is not addressed to the master device.

8. A method of a master device allocating a channel time, as recited in claim 1, wherein the method is implemented in an integrated circuit.

9. A method of a master device allocating a channel time, as recited in claim 1, wherein the method is implemented in an ultra wideband device.

10. A method of a operating a slave device in a polling scheme, comprising:
    receiving a polling frame over a transmission channel from a master device identifying a first device address as a destination address, identifying a second device address as a polled address, and containing a payload;
    processing the payload if the first device address corresponds to a slave address of the slave device;
    determining whether the slave device has data to send if the second device address corresponds to the slave address;

sending a poll acknowledgement frame over the transmission channel to the master device indicating there is no data to transmit if the slave device is determined to have no data to transmit; and sending a polled device frame over the transmission channel to a remote device different from the master device, without sending an acknowledgement frame over the transmission channel to the master device, if the slave device is determined to have data to transmit.

11. A method of a operating a slave device in a polling scheme, as recited in claim 10, further comprising sending a polling frame acknowledgement frame to the master device after processing the payload, if the first device address corresponds to a slave address of the slave device.

12. A method of a operating a slave device in a polling scheme, as recited in claim 10, further comprising receiving a polled device frame acknowledgment frame from the remote device after sending the polled device frame to the remote device.

13. A method of a operating a slave device in a polling scheme, as recited in claim 10, wherein the method is implemented in an integrated circuit.

14. A method of a operating a slave device in a polling scheme, as recited in claim 10, wherein the method is implemented in an ultra wideband device.

15. A method of a operating a slave device in a polling scheme, comprising:

receiving a polling frame over a transmission channel from a master device identifying a slave device address as a destination address, and containing a payload;

processing the payload;

determining whether the slave device has data;

sending a poll acknowledgement frame over the transmission channel to the master device indicating there is no data to transmit if the slave device is determined to have no data to transmit; and sending a polled device frame over the transmission channel to a remote device different from the master device, without sending an acknowledgement frame over the transmission channel to the master device, if the slave device is determined to have data to transmit, wherein the polled device frame includes information indicating whether the payload was properly received.

16. A method of a operating a slave device in a polling scheme, as recited in claim 15, wherein the remote device is a remote slave device.

17. A method of a operating a slave device in a polling scheme, as recited in claim 15, further comprising sending a polling frame acknowledgement frame to the master device after processing the payload.

18. A method of a operating a slave device in a polling scheme, as recited in claim 15, wherein the payload is a null payload.

19. A method of a operating a slave device in a polling scheme, as recited in claim 15, further comprising receiving a polled device frame acknowledgment frame from the remote device after sending the polled device frame to the remote device.

20. A method of a operating a slave device in a polling scheme, as recited in claim 15, wherein the method is implemented in an integrated circuit.

21. A method of a operating a slave device in a polling scheme, as recited in claim 15, wherein the method is implemented in an ultra wideband device.

* * * * *